Patented June 24, 1941

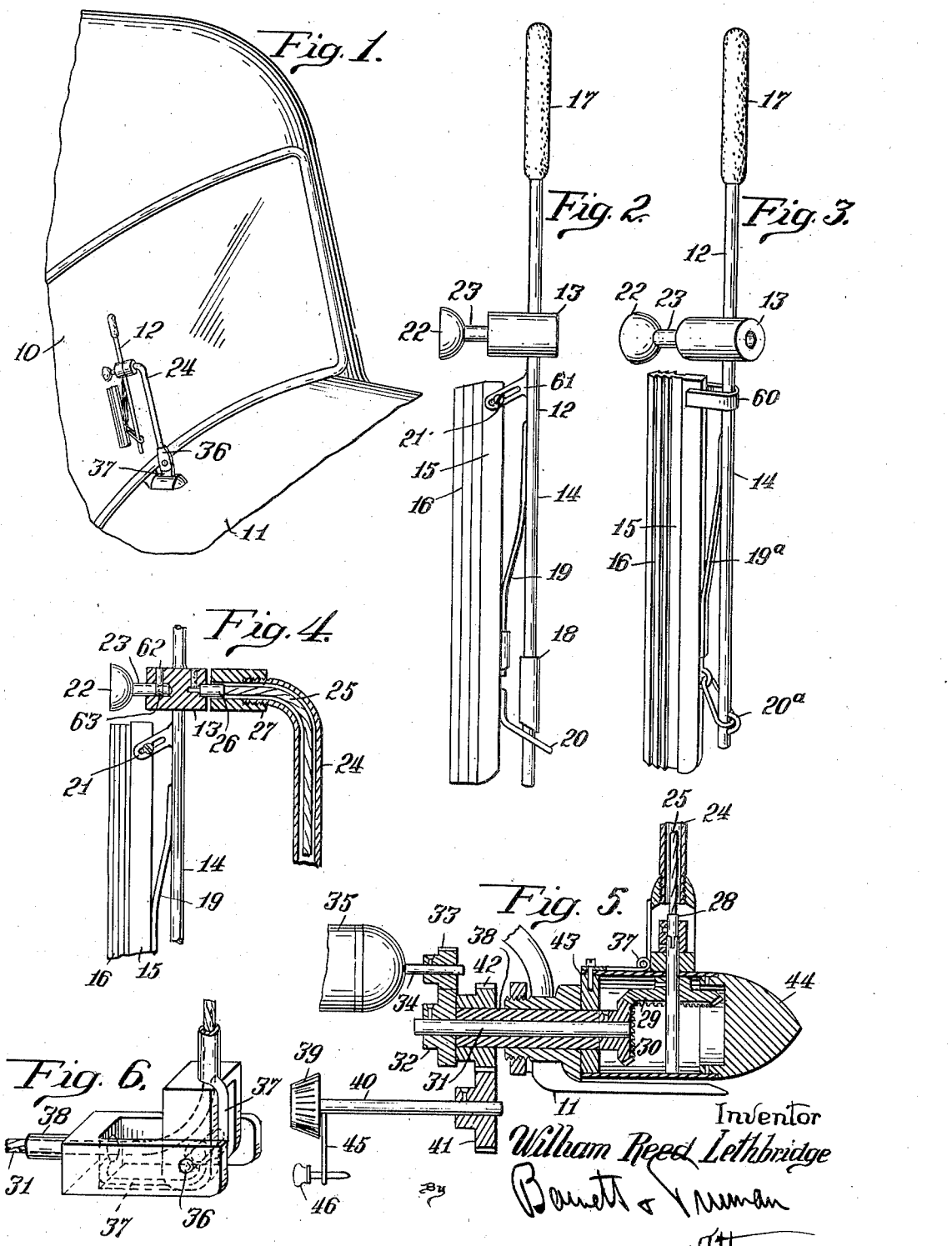

2,246,740

UNITED STATES PATENT OFFICE 2,246,740

WINDSCREEN WIPER

William Reed Lethbridge, Darlinghurst, near Sydney, New South Wales, Australia

Application August 10, 1939, Serial No. 289,405
In Australia October 1, 1938

9 Claims. (Cl. 15—250)

This invention relates to improvements in windscreen wipers and is directed to a wiping arm which has a rotary motion in contradistinction to the conventional reciprocating wiper.

Amongst the objects of the present invention are to produce a wiper, of the type referred to, which will effectively wipe the area of vision when rotating about a point of suspension over a windscreen. Rotating type wipers, as heretofore employed, have been open to a number of objections. For example, such wipers tend to impinge, when in operation, only upon a small area of the windscreen covered by their effective length, thus leading to ineffective results. It is an object of the present invention to overcome this objection and, in order to achieve this object, the windscreen wiper is adapted to be supported in front of a windscreen by a head attached to a rotatable shaft, the said head having a counterweight attached to one side, a rod on the other side and a wiper blade attached to the rod in such manner that it is caused to be centrifugally urged away from the rod and towards the windscreen, with a governed action, when the wiper is operating, means being provided to restrict the movement of the wiper blade away from its supporting rod so that it will not get out of control. In preferred forms of the invention means are provided to hold the wiper blade clear of the windscreen, when not in operation, in order to prevent deterioration of the wiper substance by adhesion to the windscreen. In further modifications of the invention means are provided to enable the wiping arm to be automatically set to the angle of the windscreen and to enable the wiping arm supporting means to be lowered or rotated from vision when not in use.

In order that the nature of the invention may be readily understood reference is made to the drawing which illustrates example forms thereof and wherein Figure 1 is a generalized perspective view showing one form of the invention set up for operation against a windscreen of, say, an automobile.

Figure 2 is a view of a wiping arm.

Figure 3 is a view showing an alternative form of wiping arm.

Figure 4 is a sectional detail about the head of a wiping arm support.

Figure 5 is a sectional detail about the base of a wiping arm support.

Figure 6 is a detail showing a modified form of a wiping arm support base.

Referring to the drawing, 10 is a windscreen and 11 represents generally part of the framework or body associated with the windscreen. 12 represents generally a wiping device carried by a head 13 and consists of bar 14, wiper blade 15 and wiper 16. 17 is a weight or weighted end of bar 14 and 18 is a sliding weight on the opposite end thereof which functions as a governor. 19 is a spring which urges blade 15 towards bar 14. 20 is an inclined stirrup which allows blade 15 a restricted movement about bar 14 and which also acts as a stop for sliding weight 18. 61 is a slotted lug depending from bar 14 in which blade 15 is allowed a restricted movement and 21 is a screw or pin holding blade 15 in attachment through the lug slot. 22 is a button of rubber, or other appropriate material carried on a short shaft 23 which is idle in the head 13. The shaft 23 will be held in suitable manner as by a pin 62 fitting loosely in a circumferential channel 63. The button 22 abuts against the windscreen and functions to steady the device.

Figure 3 shows an alternative form of wiping device wherein the sliding weight 18 is dispensed with; in this form of the invention the wiper blade 15 is swung from the bar 14 by a link member 20a and is supported by a spring 19a which is attached to the wiper blade 15, preferably at or about the location of the link 20a, and which spring is attached preferably to the bar 14 at or about the position of a pair of guides 60; guides 60, which project from bar 14, serve to position wiper blade 15 which passes between said guides; in this form of the invention the wiper blade 15 acts, itself, as the weighted member or governor; and in motion, is suspended by the link 20a, the latter being affixed both to the wiper blade 15 and the bar 14 in pivotal manner; the spring 19a has a restrictive action on the wiper arm working against the action of the link to prevent the wiper arm 15 from moving more than is required.

24 is an example form of wiping arm support and carries the drive for the wiper. 25 is a flexible drive and 26 is a short shaft attached thereto affixed to the head 13 in suitable manner. 27 is a collar. 28 is a short shaft attached at the lower end of the flexible drive 25 and adapted to be suitably rotated to drive the wiper; as for example the shaft 28 may be attached to a bevel wheel 29 which is driven by a bevel wheel 30 through shaft 31, gears 32, 33, shaft 34 and a prime mover, such as an electric motor, diagrammatically represented by 35.

As shown in Figure 6 the flexible drive 25 may be driven direct by a shaft, as 31. The support 24 is adapted to pivot at its base, as at 36, and is adapted to be urged towards the windscreen to conform to the angle thereof, as by a spring 37. The support 24 and wiper 12 may be moved away from the vision of the driver by causing the tube 38 to be rotated; this may be conveniently achieved from a dash-board through a turn button 39 shaft 40 and gears 41, 42. In the form of the invention shown in Figure 5 the tube 38 is connected to or integral with a housing 43 which houses the driving units 29 and 30; housing 43 may be provided with a removable cover plate 44 suitably attached; attached to shaft 40, near turn button 39 may be a hinged element 45 which carries a button and short shaft 46; this shaft 46 may be adapted to be inserted into a slot in the dash-board in order to hold the wiping apparatus in the operative position.

If a wiper blade of usual construction is mounted at its medial point upon the support 24 there is a pronounced tendency for the wiper, when in motion, to lift from the surface to be wiped, particularly at and about its periphery. In accordance with this invention this tendency has been overcome by imparting a weighted or governed characteristic to the wiper. In the form of the invention shown in Figure 2 the governing action is performed by a weight 18, which is free to move along the arm 14 and which, when the wiper rotates, is urged towards the end of the arm until it reaches the stirrup 20 so that, when the wiper is in motion its periphery will be urged towards the surface to be wiped. As the wiper blade 15 rides, against the action of the spring 19, on the stirrup 20 and in the slotted lug 61 it has a floating action which enables it to take up the required position in operation. The method herein described of achieving this purpose, is purely by way of example and it will be readily apparent that equivalents for the weight 18, which functions as a governor, may be employed. For example, as shown in Figure 3, the wiper blade 15 is so attached to the bar 14 that, in operation, it is suspended by the link 20a in pivotal fashion and is thrown against the windscreen thus acting as a movable weight; its limit of travel herein is restricted by the spring 19a so that it will not move further than is required.

The wiper blade 15, as shown, is capable of a limited degree of movement in relation to the arm 14 which carries it; this is to enable the wiper blade 15 and wiper 16 to adjust itself to the surface to be wiped when in motion 19, which is a light spring, serves to hold the wiper blade 15 and wiper 16 clear of the windscreen when the device is not in operation; this minimizes deterioration of the surface of the wiper through frictional contact with and adhesion to the windscreen. The spring 19 (or 19a) also serves to prevent undue strain being put upon the prime mover when the glass of the windscreen is dry, or at starting, where a high degree of friction may exist and, if the wiper slows up beyond a desirable limit of speed, for any reason, the centrifugal force of the rotating arm will be lessened and will enable the spring to lift the wiper from the windscreen thus allowing the prime mover to accelerate.

Unless otherwise provided for the rigid support 24 will require careful adjustment in order to allow the wiping arm to be correctly set up in relation to the windscreen; this may become a problem when consideration is given to the fact that windscreens, particularly automobile windscreens, vary considerably in their degree of inclination to the perpendicular position. This difficulty is overcome, herein, by employing means which enable the support 24 to be readily disposed to the angle of the windscreen as, for example, by pivoting the support 24 at its base, as at 36, and subjecting it to the influence of a spring, as 37, which urges it towards the windscreen.

It is preferred to pivot the support about its base and control its movement by a spring member which urges it forward and inclines it towards the windscreen, as previously herein indicated, so that the wiper becomes automatically disposed in correct relation to the angle of the windscreen. It is preferred that the head about which the wiper rotates, such as the head 13, should carry in non-rotatable fashion, as on a loose short shaft 23, a stop member, such as a rubber button 22, which is adapted to bear against the windscreen and steady the wiper when the latter is in motion; the button 22, or its equivalent, also serves the purpose of holding the wiping arm clear of the windscreen when the said arm is not in motion. Means of a known character, other than those herein indicated, may be employed to enable the wiper arm support to be turned away from the line of vision of the driver when the wiper is not required and, although such means are not essential, they are desirable.

In order to operate the wiper, the wiper support, if not already in the correct position, is moved thereto by suitable means such as, by turning the knob 39, which through shaft 40, gear train 41, 42 and tube 38, enables the support 24 to be moved into the upright positions (Figure 5). Where a spring member, as 37 and pivoted support base 36, are employed (as shown in Figure 6), the wiper will now automatically assume the correct inclination to the windscreen. The wiper 12 is now rotated by a suitable prime mover, such as an electric motor diagrammatically indicated at 35, through suitable gearing and driving mechanism of a known nature; for example, as indicated herein, the wiper drive may be driven through a shaft 34, from motor 35, gears 32, 33, shaft 31, gears 29, 30, flexible drive 25 and head 13. As the wiper rotates the governing weight 18, or its equivalent, moves towards the periphery of the bar 14 and its weight acting against the angularly disposed stirrup 20 of the rotating wiper causes the floating dependent wiper 15 to be urged towards the surface to be wiped therefor causing an effective wiping of the windscreen to be made by the wiper 16. It will be appreciated that the speed of rotation of the wiper will be such that, in operation, it is not visible to the driver.

It will be readily apparent from the foregoing description, that a large variety of mechanical movements, embodying known design, may be employed in order to carry the invention into practical effect. The salient feature of the invention resides in the provision of a governed wiper blade supported in a controlled manner from a rotatable carrier rod.

Having thus described and ascertained my said invention and the manner in which it is to be performed, I declare that what I claim as new and desire to secure by Letters Patent is:

1. A windscreen wiper supported in front of a windscreen consisting of a head attached to a rotatable shaft, a counter-weight on one side of the head, a rod on the opposite side of the head, a wiper arm supported by said rod and capable of slight movement relatively thereto, an angularly disposed stirrup attached to the wiper arm said stirrup passing about and towards the end of the rod aforesaid and a weight adapted to move along the rod and to bear against the stirrup.

2. A windscreen wiper supported in front of a windscreen consisting of a head attached to a rotatable shaft, a counter-weight on one side of the head, a rod on the opposite side of the head, a wiper arm supported by said rod and capable of slight movement relatively thereto, an angularly disposed stirrup attached to the wiper arm said stirrup passing about and towards the end of the rod aforesaid, a weight adapted to move along the rod and to bear against the stirrup and a spring attached to the wiper arm and rod.

3. A windscreen wiper supported in front of a windscreen consisting of a head attached to a rotatable shaft, a counter-weight on one side of the head, a rod on the opposite side of the head, guide members attached to the rod, a wiper arm supported by the rod through a link attached about the outer end of the rod said wiper arm passing between the guide members aforesaid and a spring attached to the rod and the wiper arm.

4. A windscreen wiper adapted to be supported in front of a windscreen consisting of a head attached to a rotatable shaft, a counterweight attached to one side of the head, a rod on the other side of the head, a wiper blade supported by the rod, means to cause the wiper blade to be centrifugally urged away from the rod and towards the windscreen with a governed action when the wiper is operating and means to restrict such movement of the wiper blade relative to its supporting rod.

5. A windscreen wiper adapted to be supported in front of a windscreen consisting of a head attached to a rotatable shaft, a counterweight attached to one side of the head, a rod on the other side of the head, a wiper blade supported by the rod, means to cause the wiper blade to be centrifugally urged away from the rod and towards the windscreen with a governed action when the wiper is operating, means to restrict such movement of the wiper blade relative to its supporting rod and means to hold the wiper blade away from the windscreen surface when the wiper is inoperative.

6. A windscreen wiper supported in front of a windscreen consisting of a head attached to a rotatable shaft, a counterweight attached to one side of the head, a rod on the other side of the head, a wiper blade supported by the rod, means to cause the wiper blade to be centrifugally urged away from the rod and towards the windscreen with a governed action when the wiper is operating, means to restrict such movement of the wiper blade relative to its supporting rod, a support for the wiper extending from a position near the periphery of the windscreen, a pivot in the support and a spring associated with said pivot to incline the wiping arm head towards the windscreen surface.

7. A windscreen wiper adapted to be supported in front of a windscreen consisting of a head attached to a rotatable shaft, a counterweight attached to one side of the head, a rod on the other side of the head, a wiper blade supported by the rod, means to cause the wiper blade to be centrifugally urged from the rod and towards the windscreen with a governed action when the wiper is operating, means to restrict such movement of the wiper blade relative to its supporting rod, a short shaft loosely carried on the head aforesaid said short shaft terminating in a button adapted to bear on the windscreen, a support for the wiper extending from a position near the periphery of the windscreen, a pivot in the support and a spring associated with the said pivot to incline the wiping arm head towards the windscreen surface.

8. A windscreen wiper adapted to be supported in front of a windscreen consisting of a head attached to a rotatable shaft, a counterweight attached to one side of the head, a rod attached to the other side of the head, a wiper blade supported by the rod, means to cause the wiper blade to be centrifugally urged from the rod and towards the windscreen with a governed action when the wiper is operating, means to restrict such movement of the wiper blade relative to its supporting rod, a support for the wiper extending from a position near the periphery of the windscreen, a pivot in the support, a spring associated with the pivot to incline the wiping arm head towards the windscreen and means inter-acting with the aforesaid support to enable it and the wiping arm to be moved away from the operative position.

9. A windscreen wiper adapted to be supported in front of a windscreen consisting of a head attached to a rotatable shaft, a counterweight attached to one side of the head, a rod on the other side of the head, a wiper blade supported by the rod, means to cause the wiper blade to be centrifugally urged away from the rod and towards the windscreen with a governed action when the wiper is operating, means to restrict such movement of the wiper blade relative to its supporting rod, a short shaft loosely carried on the head aforesaid said short shaft terminating in a button adapted to bear on the windscreen, a support for the wiper extending from a position near the periphery of the windscreen, a pivot in the support, a spring associated with the said pivot to incline the wiping arm head towards the windscreen and means inter-acting with the aforesaid support to enable it and the wiping arm to be moved away from the operative position.

WILLIAM REED LETHBRIDGE.